Figure 1:
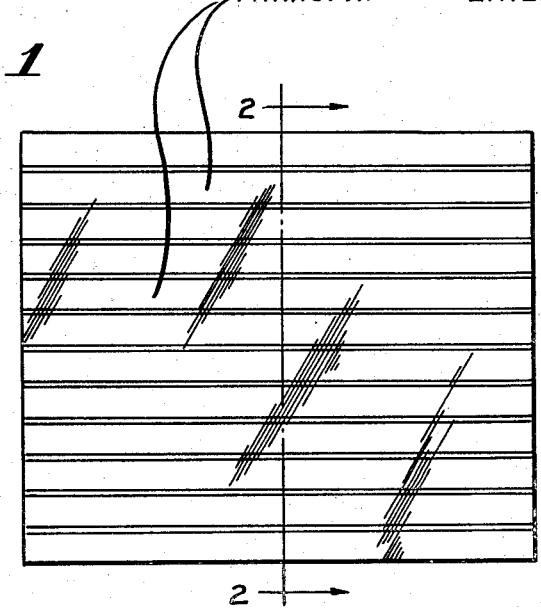

June 29, 1954  S. D. STOOKEY  2,682,134
GLASS SHEET CONTAINING TRANSLUCENT LINEAR STRIPS
Filed Aug. 17, 1951

TRANSPARENT LINEAR PORTIONS

TRANSLUCENT LINEAR PORTIONS

INVENTOR.
STANLEY DONALD STOOKEY
BY
ATTORNEY.

Patented June 29, 1954

2,682,134

UNITED STATES PATENT OFFICE 2,682,134

GLASS SHEET CONTAINING TRANSLUCENT LINEAR STRIPS

Stanley Donald Stookey, Corning, N. Y., assignor to Corning Glass Works, Corning, N. Y., a corporation of New York Application August 17, 1951, Serial No. 242,300

2 Claims. (Cl. 49—92)

This invention relates to glass sheets having clear or transparent linear portions and translucent linear portions, particularly suitable for use as louvered windows or the like.

Articles of this type are formed by suitably exposing selected portions of a transparent photosentitively opacifiable glass to short-wave radiations and thereafter heating the glass to cause precipitation of light-diffusing crystallites in the exposed portions, as described in my prior Patents Nos. 2,515,940, 2,515,941, and 2,515,943, and my pending application Serial No. 172,596, filed July 7, 1950, now Patent No. 2,651,145, issued September 8, 1953. If the article is in sheet form with the resulting translucent portions extending substantially through the sheet and arranged linearly so that they simulate horizontally arranged louvers, light striking the sheet at an angle is diffused by such translucent louvers without hindering direct vision through the transparent portions of the glass. Where such louvered sheets are used as windows, however, strong sunlight falling directly thereon produces an objectionable brightness or glare from the translucent louvers which may be so intense as to cause visual discomfort to anyone facing outwardly toward such windows.

Elimination of such glare without affecting light-diffusion through the translucent portions of the glass sheet nor substantially interfering with vision through the transparent portions is of course desirable. Heretofore, however, it has been considered that any attempt to eliminate such glare by the obvious expedient of darkening the glass with nonphotosensitive glass colorants would at the same time objectionably color or reduce the light transmission of the transparent portions of the glass sheet. Moreover, it has been thought that the use of such glass colorants in photosensitive glasses would cause undesirable absorption of short-wave radiations and thus impair the photosensitivity of the glass.

I have now discovered that, contrary to these previous beliefs, the objectionable glare of the translucent portions of such a louvered glass sheet or windowpane can be materially reduced or substantially eliminated and a pleasing neutral tint can be imparted to the sheet by incorporating in the glass nickel oxide and cobalt oxide in amounts insufficient to objectionably color the transparent portions of the glass sheet. I have found, moreover, that the coloring effect of such amounts of these oxides in the translucent portions of the glass sheet is unexpectedly more apparent to the eye, that is a greater light-absorbing effect is exhibited by such translucent portions than by the clear portions of the glass sheet. In other words, these coloring oxides in concentrations which have a scarcely noticeable light-absorptive effect in the transparent portions have a surprisingly greater light-absorptive effect in the translucent portions so that the latter appear substantially colored. Such intensified coloration of the translucent portions is probably due to the increased light path caused by multiple internal reflections by the light-diffusing crystallites contained therein. I have further found that nickel and cobalt oxides in admixture not only produce a neutral tint which is particularly suitable for my purpose but, unlike other coloring oxides, do not decrease the photosensitivity of the glass itself.

Accordingly, my invention comprises a glass sheet composed of a photosensitively opacifiable glass which contains nonphotosensitive glass-coloring components consisting of 0.01–0.3% NiO and 0.001–0.03% CoO, selected linear strips or portions of such glass sheet containing light-diffusing crystallites rendering such portions translucent, such linear translucent portions extending substantially through the sheet and being at least 20 mils wide, the remainder of the glass sheet being clear and having a visible transmission of not less than 70% in a 3 mm. thickness.

For producing glass sheets having translucent linear portions according to the invention, nickel and cobalt oxides in the above-indicated proportions may be incorporated in any photosensitively opacifiable glass. Glasses of this type are described in my prior Patents Nos. 2,515,940, 2,515,941, and 2,515,943 and my pending application Serial No. 172,596, filed July 7, 1950.

The glass of my Patent No. 2,515,940 contains either gold or silver or copper as the photosensitive ingredient and Li$_2$O in amounts so that crystallites of lithium disilicate are formed, upon heating, in those portions previously exposed to short-wave radiations. The glass of my Patent No. 2,515,941 is similar, but contains gold as the photosensitive ingredient and BaO in amounts so that crystallites of barium disilicate are formed, upon heating, in those portions previously exposed to short-wave radiations. The glass in my Patent No. 2,515,943 contains gold as the photosensitive ingredient and fluorine in amounts such that fluorine-containing crystallites are formed, upon heating, in those portions previously exposed to short-wave radiations. The glass of my pending application is similar but contains silver as the photosensitive ingredient and fluorine in amounts such that fluorine-containing crystallites are formed, upon heating, in those portions previously exposed to short-wave radiations. These various crystallites are light-diffusing, as explained in these several disclosures; and it is such crystallites which form the translucent portions of the present glass sheets.

The following batches are illustrative of glass compositions which are suitable for making such glass sheets (weights in grams except the gold solution, which is expressed in cubic centimeters):

|  | 1 | 2 | 3 | 4 |
|---|---|---|---|---|
| Sand | 1,000 | 1,000 | 1,000 | 1,000 |
| $Na_2CO_3$ | 370 | 346 | 19 | 143 |
| $NaNO_3$ |  | 39 | 17 | 47 |
| $K_2CO_3$ |  |  |  | 177 |
| $Li_2CO_3$ |  |  | 390 |  |
| $BaCO_3$ |  |  | 160 | 555 |
| $Al(OH)_3$ | 225 | 225 | 42 | 50 |
| Borax (anhydrous) | 12.5 | 22 |  |  |
| AgCl |  |  | 1.1 |  |
| $AgNO_3$ | 0.03 |  |  |  |
| Gold solution (10% Au) |  | 0.3 |  | 1.2 |
| Cerium Hydrate (75% $CeO_2$) | 0.2 | 0.22 | 0.32 | 0.8 |
| $Sb_2O_3$ | 1.4 | 1.37 |  | 0.2 |
| $Na_2SiF_6$ | 71 | 72 | 5.6 |  |
| NaBr | 5.0 |  |  |  |
| NaCl |  | 3 |  |  |

The gold solution is prepared by dissolving metallic gold in aqua regia in the proportions of 10 grams of gold per 100 cc. of solution.

To the above batches are added 0.01% to 0.3% NiO and 0.001% to 0.03% CoO on the oxide basis. Smaller amounts of NiO and CoO are ineffective for reducing glare. Larger amounts of these oxides lower the transmission of the clear portions of the glass sheet below 70% for a 3 mm. thickness, beyond which point the glass becomes objectionably colored and begins to present substantial interference with direct vision. If the oxides of nickel and cobalt are present in the ratio of about 10 to 1 by weight, a very desirable neutral grey shade or tint is obtained, indicating a substantially uniform reduction in the transmission of all visible wave-lengths. Increasing the proportion of CoO tends to shift the shade toward bluish, whereas increasing the proportion of NiO tends to shift the shade toward brownish.

Figure 2:

By way of example only, one form of embodiment of my invention is shown in the accompanying drawing, in which:

Fig. 1 is a plan view of a sheet of photosensitively opacifiable glass having clear, transparent linear portions and translucent linear strips or portions in accordance with my invention, the thickness of the translucent linear strips or portions being exaggerated for convenience; and Fig. 2 is a sectional view on line 2—2 of Fig. 1.

The spaces between the translucent portions are transparent and are of such width as to render the translucent portions effective as louvers whereby light can be transmitted in a direction perpendicular to the face of the sheet, but is partially or completely intercepted by the translucent portions in a direction at an angle to the face of the sheet and to the translucent portions. The translucent linear portions may of course extend through the sheet at any desired angle to the plane thereof other than that shown in the drawing.

So that the coloring effect in the translucent louvers will accomplish the desired purpose, the louvers should have a width of at least 20 mils. The coloration by the nickel and cobalt oxides is otherwise ineffective in reducing the glare.

What I claim is:

1. An article comprising a glass sheet composed of a photo-sensitively opacifiable glass which contains nonphotosensitive glass-coloring components consisting of NiO amounting to 0.01% to 0.3% of the glass and CoO amounting to 0.001% to 0.03% of the glass, selected linear portions of the glass sheet having been exposed to ultraviolet light and the sheet thereafter having been heated to develop in such portions light-diffusing crystallites rendering such portions translucent, said linear translucent portions extending through the sheet and being at least 20 mils wide, the remainder of the glass sheet being clear and having a visible transmission of not less than 70% in a 3 mm. thickness.

2. An article according to claim 1, in which the ratio of NiO/CoO is approximately 10/1.

References Cited in the file of this patent

UNITED STATES PATENTS

| Number | Name | Date |
|---|---|---|
| 2,515,940 | Stookey | July 18, 1950 |
| 2,515,943 | Stookey | July 18, 1950 |
| 2,581,639 | Duncan | Jan. 8, 1952 |

OTHER REFERENCES

Ceramic Industry, vol. 44, No. 1, January 1945, pages 83 and 99.